United States Patent
Hara (10) Patent No.: US 8,684,443 B2
(45) Date of Patent: Apr. 1, 2014

(54) VEHICULAR BEZEL MOUNTING STRUCTURE

(75) Inventor: Nobuhiko Hara, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/702,702

(22) PCT Filed: Apr. 19, 2011

(86) PCT No.: PCT/JP2011/059578
§ 371 (c)(1),
(2), (4) Date: Dec. 7, 2012

(87) PCT Pub. No.: WO2011/155263
PCT Pub. Date: Dec. 15, 2011

(65) Prior Publication Data
US 2013/0088032 A1     Apr. 11, 2013

(30) Foreign Application Priority Data
Jun. 8, 2010  (JP) ................................. 2010-131285

(51) Int. Cl.
*B62D 25/00*     (2006.01)
(52) U.S. Cl.
USPC ....................................................... 296/97.22
(58) Field of Classification Search
USPC ................... 24/453, 297; 29/468; 411/508; 280/728.2; 368/294, 295; 439/587
See application file for complete search history.

(56) References Cited

U.S. PATENT DOCUMENTS

| 4,653,660 A | * | 3/1987 | Shaw ........................... 220/86.2 |
| 4,811,984 A | * | 3/1989 | Hempel ..................... 296/97.22 |
| 4,954,932 A | * | 9/1990 | Isenga ........................... 362/477 |
| 5,090,760 A | * | 2/1992 | Wheeler ...................... 296/1.06 |

(Continued)

FOREIGN PATENT DOCUMENTS

| JP | 06-270736 A | 9/1994 |
| JP | 2009228714 A | 10/2009 |

OTHER PUBLICATIONS

International Search Report for Application No. PCT/JP2011/059578 dated Jun. 14, 2011.

*Primary Examiner* — Kiran B Patel
(74) *Attorney, Agent, or Firm* — Lerner, David, Littenberg, Krumholz & Mentlik, LLP (57) ABSTRACT

The present invention provides a vehicular bezel mounting structure in which an annular bezel 114 is mounted to a hole 106 formed in a vehicle body, the edge of the hole includes: an arcuate part 108 provided along a base circle; a concave part 110 cut off to the outside in the radial direction with respect to the base circle; and a projecting part 112a formed with a projecting piece 112 projecting to the inside in the radial direction within the range of the concave part, the bezel 114 comprising: a body part 114b inserted into the hole; an annular flange part which covers the edge of the hole from the outside; and a plurality of claw parts (116, 112) which are projectingly provided on the outer peripheral surface of the body part, wherein one claw part 116 of the plurality of claw parts can hold the projecting piece 112 of the hole between the one claw part 116 and the back surface of the flange part 114a; and when the bezel 114 is mounted to the hole 106, the projecting piece 112 can be elastically deformed by being pushed by the tip end of the flange part 114 adjacent to the one claw part 116.

4 Claims, 6 Drawing Sheets

(56) References Cited

U.S. PATENT DOCUMENTS

| | | | |
|---|---|---|---|
| 5,674,087 A * | 10/1997 | Kirma | 439/321 |
| 5,870,844 A * | 2/1999 | Lin | 40/411 |
| 5,906,406 A * | 5/1999 | Pajakowski | 296/97.22 |
| 6,164,482 A * | 12/2000 | Araki et al. | 220/375 |
| 6,237,798 B1 * | 5/2001 | Sung | 220/375 |
| 6,352,295 B1 * | 3/2002 | Leitner | 296/97.22 |
| 6,435,233 B1 * | 8/2002 | Miura et al. | 141/390 |
| 6,508,501 B1 * | 1/2003 | Meinke | 296/97.22 |
| 6,918,504 B2 * | 7/2005 | Miura et al. | 220/86.2 |
| 7,025,222 B2 * | 4/2006 | Hagano et al. | 220/375 |
| 7,281,640 B2 * | 10/2007 | Hagano et al. | 220/375 |
| 7,311,348 B1 * | 12/2007 | Bang | 296/97.22 |
| 7,677,631 B1 * | 3/2010 | Zischke et al. | 296/97.22 |
| 7,740,301 B2 * | 6/2010 | Hirano | 296/97.22 |
| 7,967,361 B2 * | 6/2011 | Scott et al. | 296/97.2 |
| 8,033,415 B2 * | 10/2011 | Shimoda et al. | 220/562 |
| 8,162,375 B2 * | 4/2012 | Gurtatowski et al. | 296/97.22 |
| 8,261,581 B2 * | 9/2012 | Cerruti et al. | 68/17 R |
| 8,382,188 B2 * | 2/2013 | Woodworth et al. | 296/97.22 |
| 2001/0054829 A1 * | 12/2001 | Hagano et al. | 296/97.22 |
| 2002/0021017 A1 * | 2/2002 | Foltz | 296/97.22 |
| 2002/0130531 A1 * | 9/2002 | Leitner | 296/97.22 |
| 2003/0098304 A1 * | 5/2003 | Foltz | 220/86.2 |
| 2007/0210607 A1 * | 9/2007 | Murabayashi et al. | 296/97.22 |
| 2008/0136210 A1 * | 6/2008 | Scott et al. | 296/97.22 |
| 2008/0210692 A1 * | 9/2008 | Fujita | 220/562 |
| 2009/0309386 A1 * | 12/2009 | Yamamoto | 296/97.22 |
| 2010/0072774 A1 * | 3/2010 | Bar | 296/97.22 |
| 2010/0237650 A1 * | 9/2010 | Takahashi et al. | 296/97.22 |
| 2011/0025087 A1 * | 2/2011 | Ramos | 296/97.22 |
| 2012/0161462 A1 * | 6/2012 | Zentner | 296/97.22 |
| 2013/0055809 A1 * | 3/2013 | Kawashima et al. | 73/431 |
| 2013/0095678 A1 * | 4/2013 | Hara | 439/136 |

* cited by examiner

VEHICULAR BEZEL MOUNTING STRUCTURE

CROSS-REFERENCE TO RELATED APPLICATION

The present application is a national phase entry under 35 U.S.C. §371 of International Application No. PCT/JP2011/059578 filed Apr. 19, 2011, published in Japanese, which claims priority from Japanese Patent Application No. JP 2010-131285 filed Jun. 8, 2010, all of which are incorporated herein by reference.

TECHNICAL FIELD

The present invention relates to a structure for mounting an annular bezel to a hole formed in a vehicle body.

BACKGROUND ART

To provide a charging connector for an electric vehicle or a plug-in hybrid car, a fuel filler opening for a gasoline-fueled automobile, a fog lamp, and the like, a hole is formed in a vehicle body. In such a hole, a retainer, called a "bezel", is provided in some cases.

For example, Patent Literature 1 discloses a fog lamp bezel in which a flange part having an outside diameter larger than the diameter of a mounting hole formed in a vehicle body is provided in a front surface portion, and a locking claw having elasticity and a block-shaped fixing claw are provided on the upper and lower outer peripheral surfaces, respectively, at the rear of the flange part. The fog lamp bezel of this type is fixed to a front bumper by locking the locking claw having elasticity and the block-shaped fixing claw to peripheral edge portions of the mounting hole in the vehicle body. Therefore, neither a bracket nor a screw is needed, the mounting work can be performed easily and quickly, and the number of parts can be reduced.

CITATION LIST

Patent Literature

[PTL 1] Japanese Unexamined Patent Application Publication No. 6-270736

SUMMARY OF INVENTION

Technical Problem

In the case in which the claw parts (locking claw, fixing claw) of the bezel are locked to the hole (mounting hole) formed in the vehicle body as in the technique disclosed in Patent Literature 1, the tip end of the flange part is rubbed against the end portion of the hole at the time of locking, and it thereby may be damaged. If the tip end of the flange part is damaged, the appearance is impaired, and thereby the marketability is decreased.

The present invention has been made to solve the above problem, and accordingly, an object thereof is to provide a vehicular bezel mounting structure in which, when a bezel is mounted to a hole formed in a vehicle body, the tip end of a flange part can be restrained from being rubbed against the end portion of the hole and damaged.

Solution to Problem

To achieve the above object, the present invention provides a vehicular bezel mounting structure in which an annular bezel is mounted to a hole formed in a vehicle body, the edge of the hole includes: an arcuate part provided along a base circle; a concave part cut off to the outside in the radial direction with respect to the base circle; and a projecting part formed with a projecting piece projecting to the inside in the radial direction within the range of the concave part, the bezel comprising: a body part inserted into the hole; an annular flange part which covers the edge of the hole from the outside; and a plurality of claw parts which are projectingly provided on the outer peripheral surface of the body part, wherein one claw part of the plurality of claw parts can hold the projecting piece of the hole between the one claw part and the back surface of the flange part; and when the bezel is mounted to the hole, the projecting piece can be elastically deformed by being pushed by the tip end of the flange part adjacent to the one claw part.

Such a bezel is inserted into the hole from one side of the bezel in a state of being inclined slantwise so that the edge of the hole formed in the vehicle body is held between the back surface of the flange part and the one claw part. Then, the other side (the side opposite to the one claw part) of the bezel is turned stepwise from this state of being inclined slantwise so that the bezel becomes substantially horizontal with respect to the hole, whereby the bezel is mounted to the hole.

In the present invention, the projecting piece projecting to the inside in the radial direction is formed within the range of the concave part of the hole, and one side of the bezel is inserted so that this projecting piece is held between the back surface of the flange part and the one claw part. When the other side of the bezel is turned stepwise from this state of being inclined slantwise so that the bezel becomes substantially horizontal with respect to the hole, the projecting piece is elastically deformed by being pushed by the tip end of the flange part adjacent to the one claw part. This elastic deformation continues until the other side of the bezel is turned to a predetermined or larger angle. When the other side of the bezel is turned to the predetermined or larger angle, the projecting piece enters immediately to the back side of the flange part, and the elastic deformation is released. Therefore, according to the above-described configuration, the one claw part can be engaged with the hole while the rubbing of the tip end of the flange part is reduced, so that the tip end of the flange part can be restrained from being damaged.

In the present invention, the projecting part (projecting piece) preferably has an arcuate shape. In this case, the projecting piece can have a balance between elasticity and rigidity. If the rigidity is too high, the amount of elastic deformation of the projecting piece runs short in the process in which the other side of the bezel is turned, so that the tip end of the flange part cannot be restrained from being damaged. On the other hand, if the rigidity is too low, the projecting piece may be damaged.

In the preferred embodiment of the present invention, the hole is formed in a bumper of the vehicle body. Such an arrangement is especially suitable for the bezel of a charging connector for an electric vehicle and a plug-in hybrid car.

Advantageous Effects of Invention

According to the present invention, there can be provided a vehicular bezel mounting structure in which, when a bezel is mounted to a hole formed in a vehicle body, the tip end of a flange part can be restrained from coming into contact with the end portion of the hole and being damaged.

BRIEF DESCRIPTION OF DRAWINGS

FIG. 2a is a perspective view of a bezel in accordance with an embodiment of the present invention, FIG. 2b is a sectional view taken along the line A-A of FIG. 2a, and FIG. 2c is a right-hand side view of the bezel.

DESCRIPTION OF EMBODIMENTS

A preferred embodiment of the present invention will now be described in detail with reference to the accompanying drawings. The dimensions, materials, other specific numeric values, and the like shown in this embodiment are merely enumeration of examples for easy understanding of invention, and do not restrict the present invention unless otherwise described. In this description and the drawings, the same reference signs are applied to elements having substantially the same function or configuration, and the explanation thereof is omitted, and the illustration of elements that do not relate directly to the present invention is omitted.

Figure 1A:
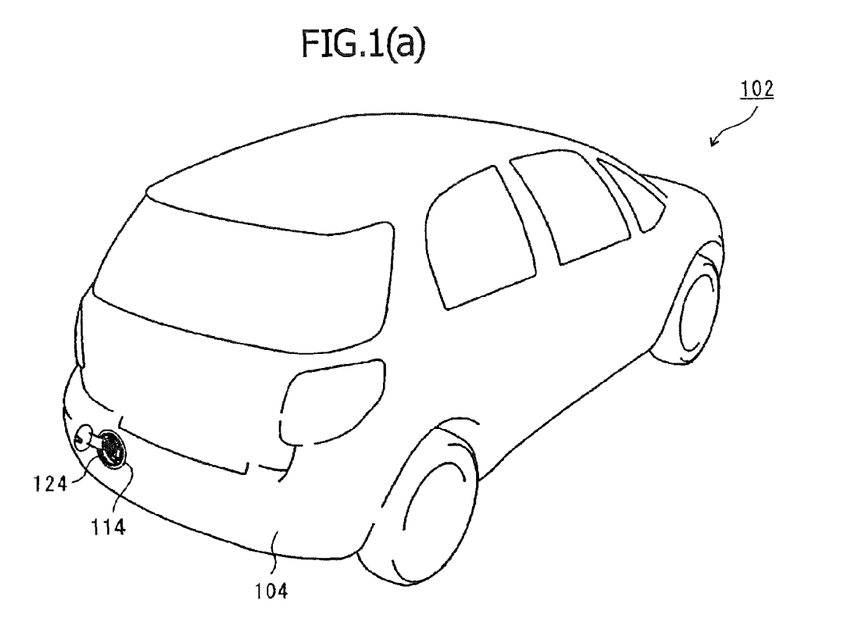
FIG. 1a is a perspective view of a vehicle provided with a charging connector to which a bezel mounting structure in accordance with an embodiment of the present invention is applied.
Figure 1B:
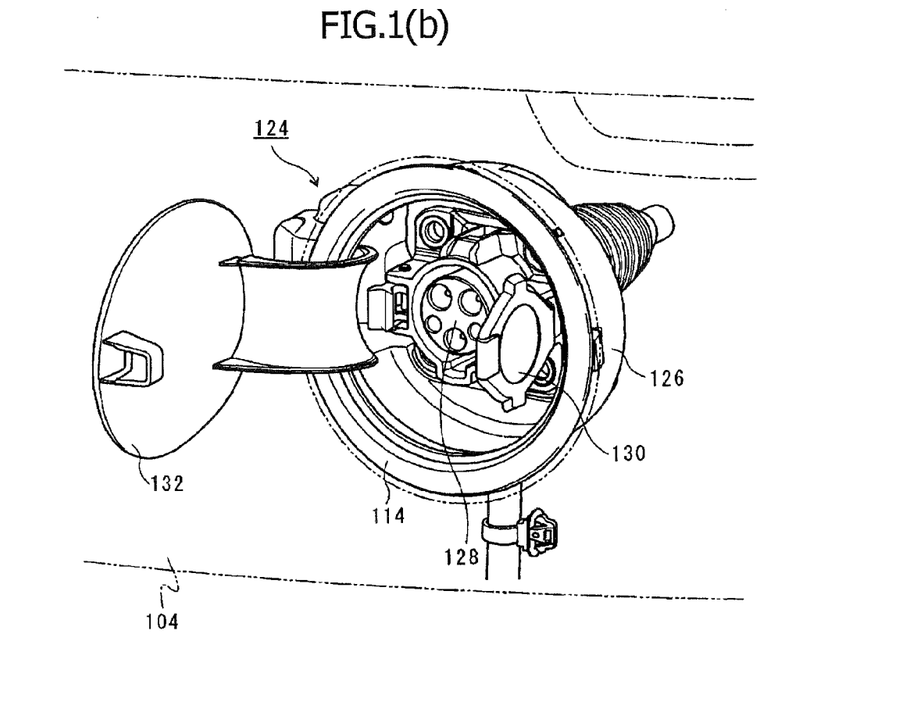
FIG. 1b is an enlarged view of the charging connector.

FIG. 1a is a perspective view of a vehicle provided with a charging connector to which a bezel mounting structure in accordance with an embodiment of the present invention is applied, being viewed from the rear, and FIG. 1b is an enlarged view of a portion near the charging connector. In FIG. 1b, for convenience, a rear bumper 104 is shown by two-dot chain lines.

As shown in FIG. 1a, a vehicle that is an electric vehicle or a plug-in hybrid car (hereinafter, referred to an automobile 102) is provided with a charging connector 124 for charging an onboard battery (not shown). In this embodiment, the charging connector 124 is provided in a hole 106 formed in the rear bumper 104.

As shown in FIG. 1b, the charging connector 124 has a connector connecting part 128 in a casing 126 thereof. The connector connecting part 128 is a so-called terminal into which the plug of an external charging cable is inserted. The connector connecting part 128 is covered with an inner lid 130. By providing this inner lid 130, the connector connecting part 128 can be suitably protected from rainwater and the like. On the outside of the inner lid 130, an annular bezel 114 and an outer lid 132 for closing the opening of the bezel 114 are provided.

Figure 3A:
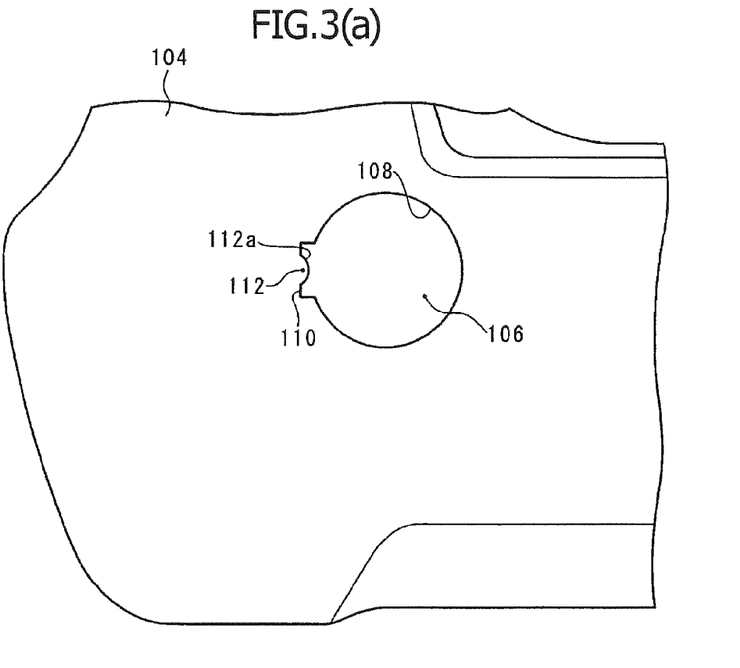
FIG. 3a is a front view of a hole to which a bezel in accordance with an embodiment of the present invention is mounted.

The bezel 114 is a retainer, and plays a role in mounting a composite (a so-called comp), which is constructed by combining the casing 126, the connector connecting part 128, the inner lid 130, and the outer lid 132, to the hole 106 shown in FIG. 3a. The details of the mounting procedure are described later with reference to FIGS. 4 to 6.

Figures 2A, 2B, 2C:
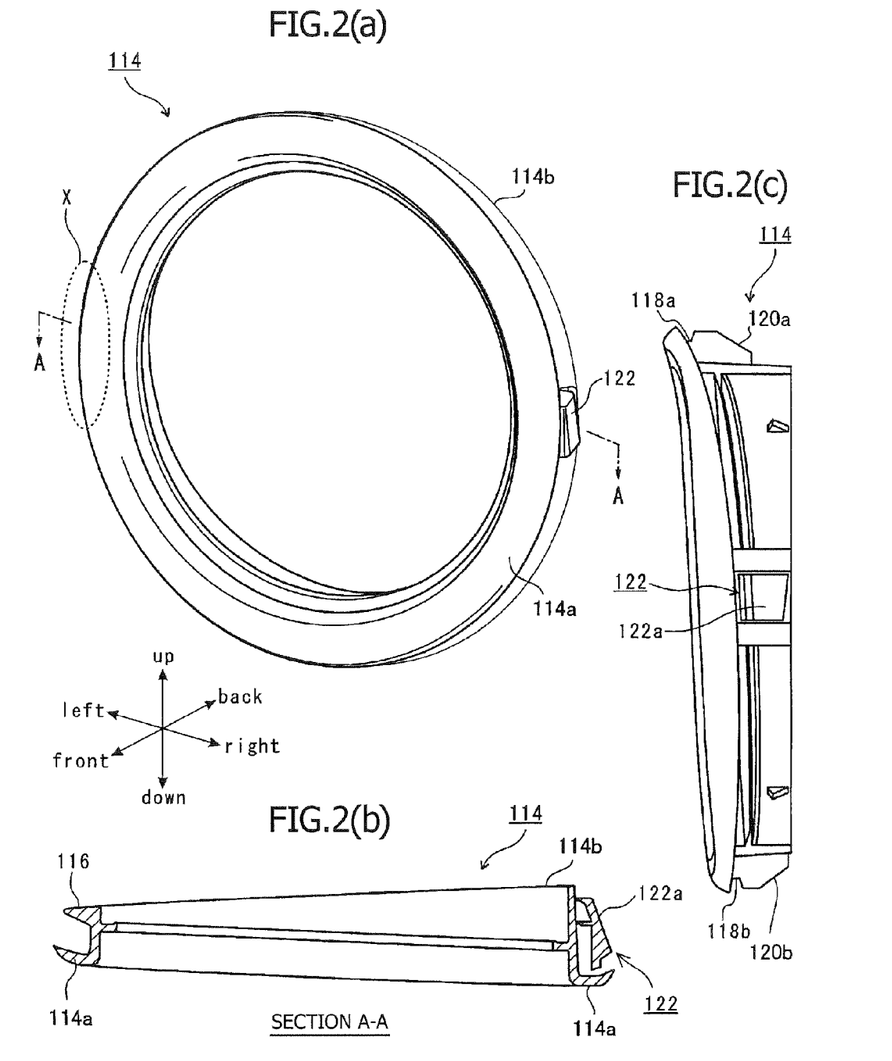

FIG. 2a is an appearance view of the bezel 114, FIG. 2b is a sectional view taken along the line A-A of FIG. 2a, and FIG. 2c is a right-hand side view of the bezel 114. As shown in FIG. 2a, the bezel 114 includes a flange part 114a that covers the outer surface of the hole 106 in the rear bumper 104 and a body part 114b that is fitted into the hole 106, and is formed of a resin-made material.

As shown in FIG. 2b, the body part 114b of the bezel 114 positioned on the left-hand side is projectingly provided with a claw part 116. In the body part 114b on the opposite side (right-hand side), a locking member 122a that can be retreated by elastic deformation is formed, thereby constituting a locking part 122.

The claw part 116 has a shape such that the distance between the inside of the claw part 116 and the back surface of the flange part 114a becomes shorter toward the root of the claw part 116 because the inside of the claw part 116 is inclined. The tip end of the flange part 114a adjacent to the claw part 116 is positioned in range X shown in FIG. 2a, and become visible at the time of vehicle completion. Therefore, if the tip end of the flange part 114a is damaged, the marketability is decreased.

As shown in FIG. 2c, in the body part 114b on the upper and lower sides of the bezel 114, groove parts 118a and 118b, which fit to the upper and lower edges of the hole 106, are provided, respectively. On the back surface side of the groove part 118a, 118b, there is provided an inclined face 120a, 120b that guides the upper or lower edge of the hole 106 so as fit the edge to the groove part 118a, 118b. The height of the inclined face 120a, 120b decreases toward the back surface side.

Figure 3B:
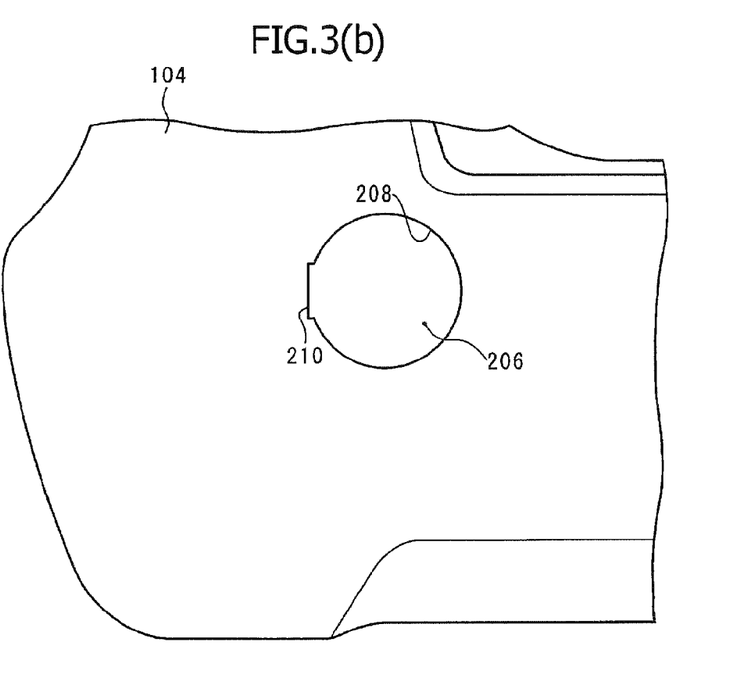
FIG. 3b is a front view of a hole in accordance with comparative example.

FIG. 3a is an appearance view of the hole 106 in accordance with an embodiment of the present invention, and FIG. 3b is an appearance view of a hole 206 of comparative example. As shown in FIG. 3a, the hole 106 is basically defined by an arcuate part 108 provided along a base circle and a concave part 110 cut off partially to the outside (left-hand side) with respect to the base circle. Further, a projecting part 112a is formed by a projecting piece 112 projecting from the concave part 110 toward the inside of the hole 106.

The projecting piece 112 has a flexible property because of being a cantilevered piece. That is, when a predetermined external force is applied, the projecting piece 112 can be elastically deformed. However, if the projecting piece 112 is lacking in rigidity too much, it may be damaged. On the other hand, although naturally, if the elasticity is too high, the projecting piece 112 is scarcely deformed elastically.

Accordingly, in this embodiment, the projecting part 112a of the projecting piece 112 is set so as to have an arcuate shape. By forming the projecting part 112a into an arcuate shape, the projecting piece 112 is caused to have an optimal balance between elasticity and rigidity. The formation of the projecting part 112a into an arcuate shape is only a preferred example, and the projecting part 112a may be formed into a rectangular shape or other shapes.

On the other hand, the hole 206 of comparative example shown in FIG. 3b is not provided with a configuration corresponding to the projecting part 112a (the projecting piece 112) of the hole 106 of this embodiment although being formed with an arcuate part 208 and a concave part 210. Hereunder, referring to FIGS. 4 to 6, the effect achieved by this embodiment is explained by comparing the hole 106 of this embodiment with the hole 206 of comparative example.

Figure 4:
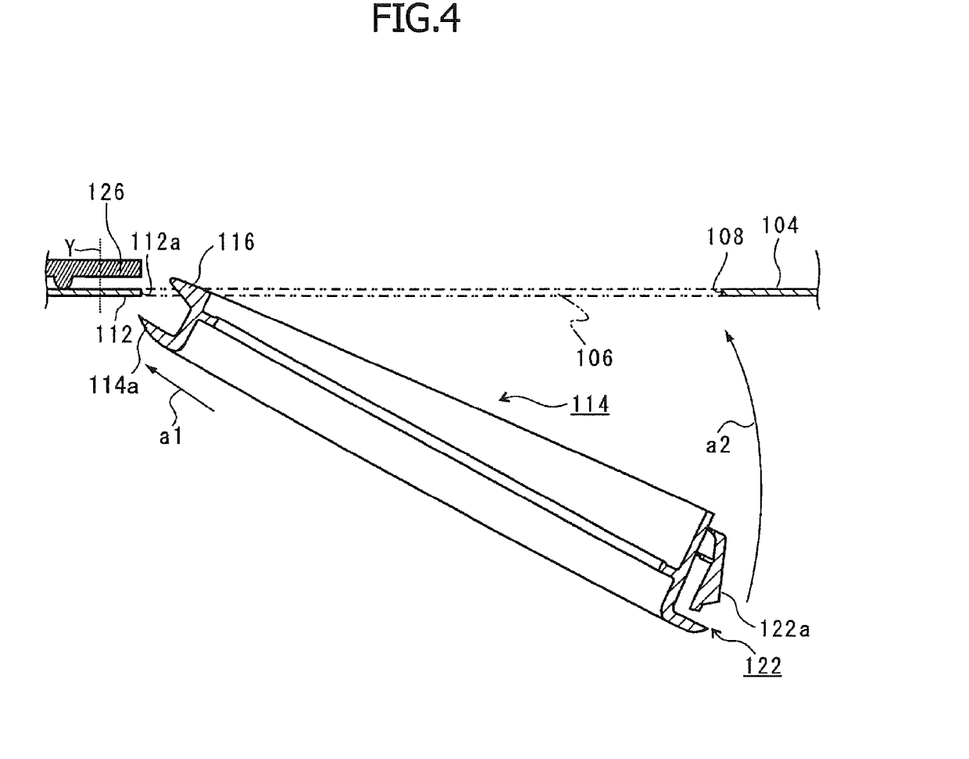
FIG. 4 is an explanatory view showing a process in which a bezel is mounted to a hole in accordance with an embodiment of the present invention.

FIG. 4 is an explanatory view showing a process in which the bezel 114 is mounted to the hole 106 shown in FIG. 3a. As shown in FIG. 4, the bezel 114 is inserted in the direction of arrow mark a1 in a state of being inclined slantwise with respect to the hole 106 so that the total thickness of the projecting piece 112 of the rear bumper 104 and the casing 126 of the charging connector 124 is held between the back surface of the flange part 114a and the claw part 116 (a first step). Then, from this state of being inclined slantwise, the other side of the bezel 114 formed with the locking part 122 is turned stepwise in the direction of arrow mark a2 until the bezel 114 becomes substantially horizontal with respect to the hole 106 (a second step).

The reason why the other side of the bezel 114 is turned stepwise with the claw part 116 substantially being the center of rotation is that during the turning, the inclined faces 120a and 120b (refer to FIG. 2c) are caused to guide the upper and lower edges of the hole 106, which are the arcuate part 108, respectively. According to the above-described process, since the inclined faces 120a and 120b linearly advance to the upper and lower edges of the hole 106, respectively, the upper and lower edges of the hole 106 can be fitted properly into the groove parts 118a and 118b, respectively.

FIG. 5 is explanatory views showing the mounting process shown in FIG. 4 in more detail. In FIG. 5, the process in which the bezel 114 is turned stepwise in the direction of arrow mark a2 is shown in the order by using FIGS. 5a to 5d. In FIGS. 5a to 5d, the position of the bottom face of the concave part 110 of the hole 106 is indicated by reference line Y.

Figure 5A:
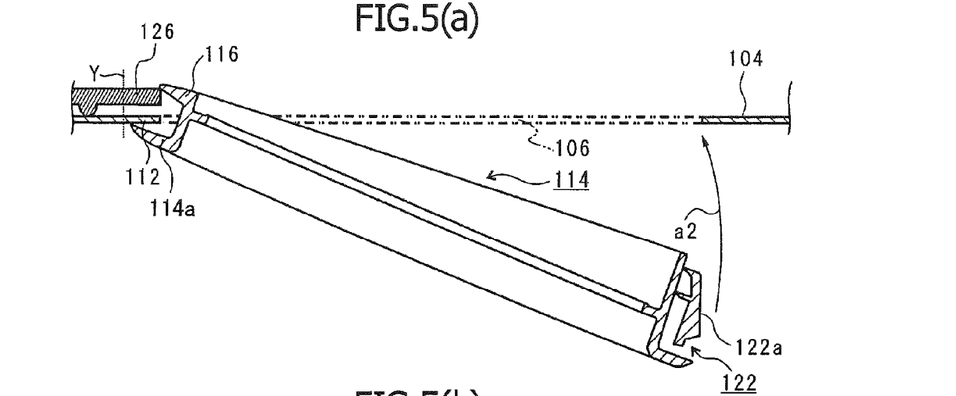
FIGS. 5a, 5b, 5c and 5d are explanatory views showing the mounting process shown in FIG. 4 in more detail.

FIG. 5a shows a state in which the claw part 116 is inserted so as to hold the projecting piece 112 and the casing 126 between the claw part 116 and the back surface of the flange part 114a in the first step. From this state, the worker turns the other side of the bezel 114 in the direction of arrow mark a2 while pushing the bezel 114 to the direction of the tip end of the claw part 116.

As described above, in this embodiment, the configuration is made such that the inside of the claw part 6 is inclined, and the distance between the back surface of the flange part 114a and the claw part 116 becomes shorter toward the root of the claw part 116. Therefore, when the bezel 114 is turned while being pushed as described above, the claw part 116 advances deeper to the back side of the stationary casing 126, and thereby the claw part 116 is relatively moved to the vehicle front side (upper side in FIG. 5). Therefore, the tip end of the flange part 114a pushes the projecting piece 112.

Figure 5B:
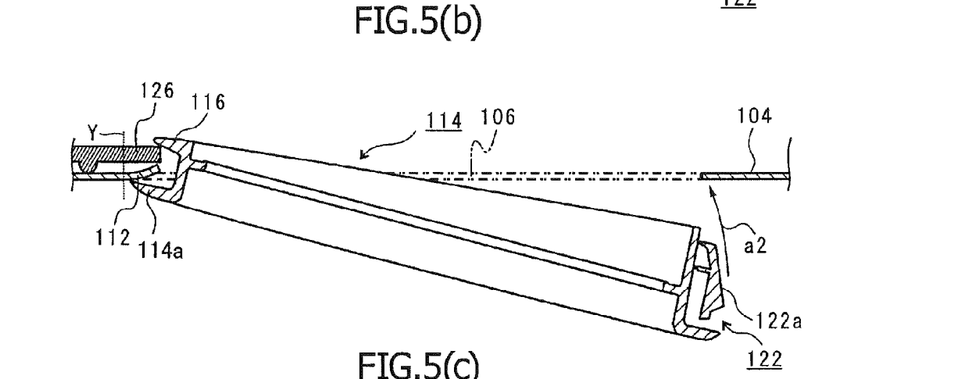

As shown in FIG. 5b, the projecting piece 112 is elastically deformed (deflected) by being pushed by the tip end of the flange part 114a. As the other side of the bezel 114 is turned in the direction of arrow mark a2, the flange part 114a is pushed further against the projecting piece 112 (the righthand side of the reference line Y in FIG. 5), and the projecting piece 112 is further deflected, the elastic deformation proceeding.

Figure 5C:
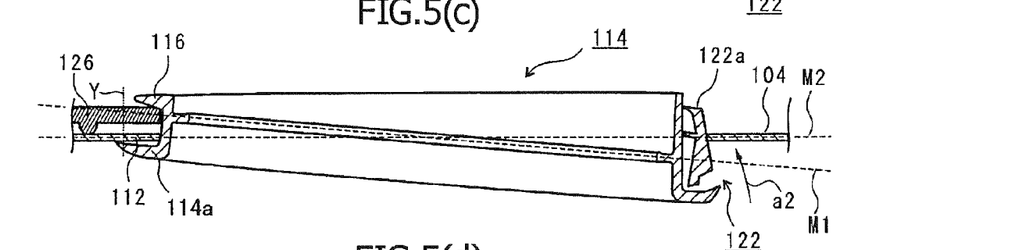

The elastic deformation of the projecting piece 112 continues until the other side of the bezel 114 is turned in the direction of arrow mark a2 to a predetermined or larger angle. As shown in FIG. 5c, when the other side of the bezel 114 is turned to the predetermined or larger angle, the claw part 116 advances immediately to the back side of the casing 126, and the elastic deformation of the projecting piece 112 caused by the flange part 114a is released.

A feature of this embodiment is that during the time when the projecting piece 112 is elastically deformed, the relative position of the tip end of the flange part 114a with respect to the projecting piece 112 does not change. That is, the tip end of the flange part 114a and the projecting piece 112 do not rub against each other, and the projecting piece 112 is merely deformed elastically, so that the tip end of the flange part 114a is not damaged. When the elastic deformation is released, the angle that the centerline M1 of the bezel 114 makes with the centerline M2 of the hole 106 (the insertion angle) becomes small, and the flange part 114a immediately covers the projecting piece 112. Therefore, the tip end of the flange part 114a can be prevented from being rubbed and damaged.

Figure 5D:
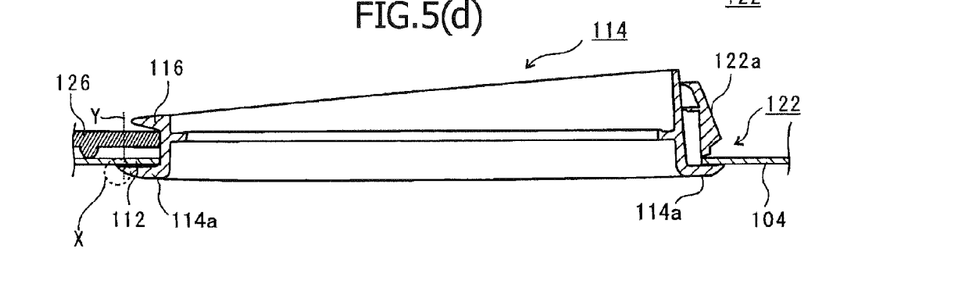

As shown in FIG. 5d, at the final stage of turning of the other side of the bezel 114 in the direction of arrow mark a2, the locking member 122a is elastically deformed and retreated, and the edge portion of the hole 106 is locked to the locking part 122. Thereby, the mounting of the bezel 114 to the hole 106 in the rear bumper 104 (the casing 126) is finished while the flange part 114a positioned in the sightable range X is scarcely damaged.

Hereunder, as a comparative example, a process in which the bezel 114 is mounted to the hole 206 shown in FIG. 3b is explained with reference to FIGS. 6a to 6d. This work of mounting the bezel 114 to the hole 206 is also carried out by the above-described procedure of the first step and the second step.

Figure 6A:
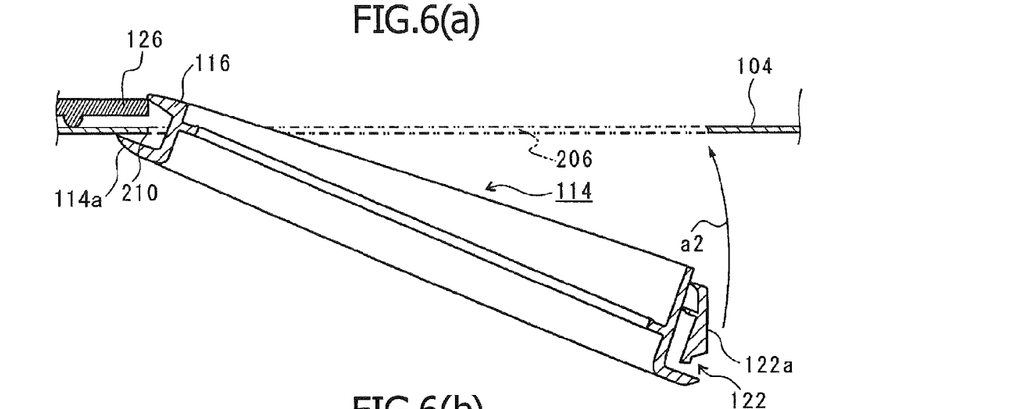
FIGS. 6a, 6b, 6c and 6d are explanatory views showing a mounting process of a bezel to a hole in accordance with a comparative example.
Figure 6B:
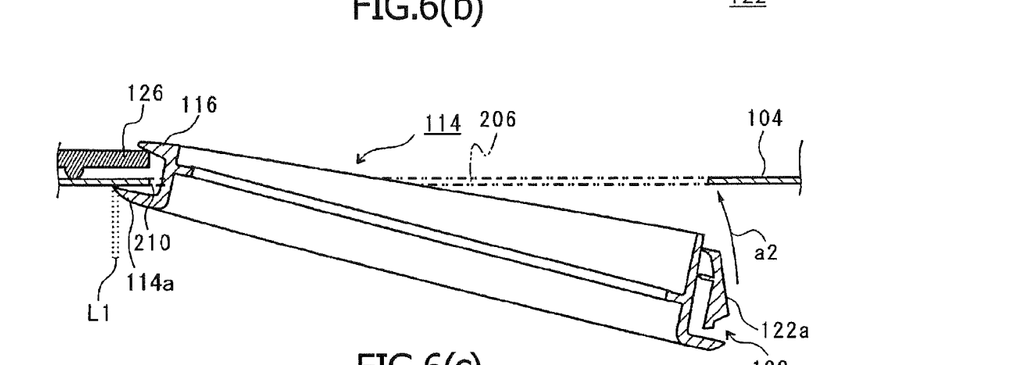
Figure 6C:
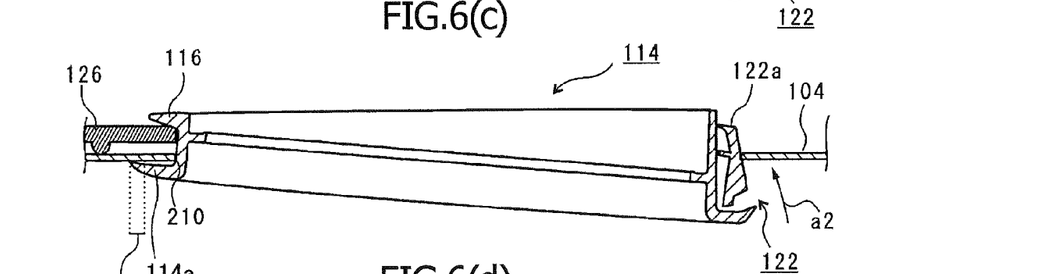

FIG. 6a shows a state in which the claw part 116 is inserted so as to hold the concave part 210 and the casing 126 between the claw part 116 and the back surface of the flange part 114a in the first step. From this state, the other side of the bezel 114 is turned in the direction of arrow mark a2 as in the above-described embodiment. In the comparative example, even when the concave part 210 is pushed by the flange part 114a of the bezel 114, the concave part 210 (the end portion of the hole 206) is not elastically deformed. Therefore, when the other side of the bezel 114 is turned in the direction of arrow mark a2 while the flange part 114a is pushed against the concave part 210, the tip end of the flange part 114a moves to the inside while rubbing against the end portion of the hole 206 (in FIG. 6b, the travel distance of the flange part 114a from the position shown in FIG. 6a is shown as L1).

As the other side of the bezel 114 is turned in the direction of arrow mark a2, the tip end of the flange part 114a moves to the inside while rubbing against the end portion of the hole 206. Therefore, before the state shown in FIG. 6c in which the claw part 116 advances completely to the back side of the casing 126 is reached, the edge of the flange part 114a may be damaged (in FIG. 6c, the travel distance of the flange part 114a from the position shown in FIG. 6a is shown as L2).

Figure 6D:
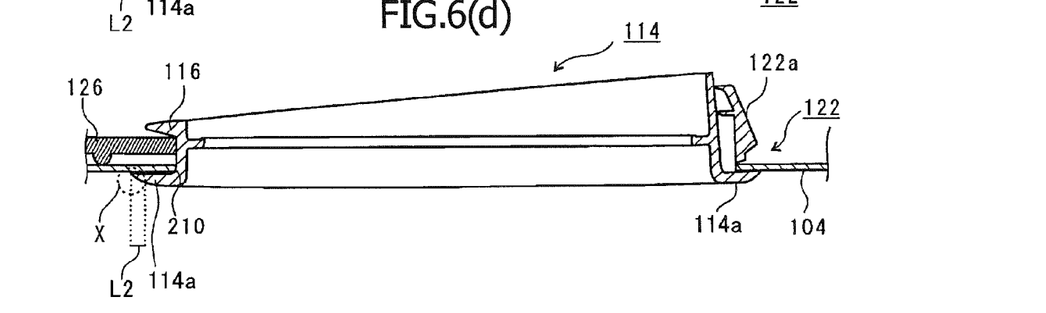

Therefore, as shown in FIG. 6d, at the final stage of turning of the other side of the bezel 114 in the direction of arrow mark a2, the mounting of the bezel 114 to the hole 206 is finished by the locking of the locking part 122. In the comparative example, however, the flange part 114a positioned in the visible range X is damaged, and thereby the marketability is decreased.

As can be seen by the comparison with the comparative example, according to the vehicular bezel mounting structure in accordance with this embodiment, when the bezel 114 is mounted to the hole 106, the tip end of the flange part 114a can be restrained from coming into contact with the end portion of the hole 106 and being damaged. Therefore, impaired appearance and decreased marketability can be prevented.

The above is an explanation of the preferred embodiment of the present invention given with reference to the accompanying drawings. Needless to say, the present invention is not limited to the above-described embodiment. For example, in the above-described embodiment, there has been explained the case in which the vehicular bezel mounting structure is applied to the charging connector 124. However, the vehicular bezel mounting structure can naturally be applied to any other vehicle part. It is apparent that the person skilled in the art can come up with various changed examples or modified examples without departing from the spirit and scope set out in the accompanying claims, and it is understood that these changed examples and modified examples fall within the technical scope of the present invention.

INDUSTRIAL APPLICABILITY

The present invention can be used in a vehicular bezel mounting structure having a hole formed in a vehicle body and an annular bezel mounted to the edge of the hole.

REFERENCE SIGNS LIST 102 automobile
104 rear bumper
106, 206 hole
108, 208 arcuate part
110, 210 concave part
112 projecting piece
112a projecting part
114 bezel
114a flange part
114b body part
116 claw part (one claw part)
118a, 118b groove part
120a, 120b inclined face
122 locking part (the other claw part)
122a locking member
124 charging connector
126 casing
128 connector connecting part
130 inner lid
132 outer lid

The invention claimed is:

1. A vehicular bezel mounting structure in which an annular bezel is mounted to a hole formed in a vehicle body, the edge of the hole includes: an arcuate part provided along a base circle; a concave part cut off to the outside in the radial direction with respect to the base circle; and a projecting part formed with a projecting piece projecting to the inside in the radial direction within the range of the concave part, the bezel comprising: a body part inserted into the hole; an annular flange part which covers the edge of the hole from the outside; and a plurality of claw parts which are projectingly provided on the outer peripheral surface of the body part, wherein one claw part of the plurality of claw parts can hold the projecting piece of the hole between the one claw part and the back surface of the flange part; and when the bezel is mounted to the hole, the projecting piece can be elastically deformed by being pushed by the tip end of the flange part adjacent to the one claw part.

2. The vehicular bezel mounting structure according to claim 1, characterized in that the projecting part has an arcuate shape.

3. The vehicular bezel mounting structure according to claim 1, characterized in that the hole is formed in a bumper of the vehicle body.

4. The vehicular bezel mounting structure according to claim 2, characterized in that the hole is formed in a bumper of the vehicle body.

* * * * *